United States Patent
Goyal et al.

(10) Patent No.: US 10,928,960 B1
(45) Date of Patent: Feb. 23, 2021

(54) SYSTEM AND METHOD TO TRACK MOVEMENT OF AN INTERACTIVE FIGURINE ON A TOUCH SCREEN INTERFACE

(71) Applicant: Mobilizar Technologies Pvt Ltd, Bengaluru (IN)

(72) Inventors: Vivek Goyal, Bangalore (IN); Dinesh Advani, Bengaluru (IN)

(73) Assignee: Mobilizar Technologies Pvt Ltd, Bangalore (IN)

( * ) Notice: Subject to any disclaimer, the term of this patent is extended or adjusted under 35 U.S.C. 154(b) by 0 days.

(21) Appl. No.: 16/839,361

(22) Filed: Apr. 3, 2020

(30) Foreign Application Priority Data

Feb. 21, 2020 (IN) .............................. 202041007488

(51) Int. Cl.
*G06F 3/044* (2006.01)
(52) U.S. Cl.
CPC .................................. *G06F 3/0443* (2019.05)
(58) Field of Classification Search
CPC .................. G06F 3/0443; G06F 3/041–04886
See application file for complete search history.

(56) References Cited

U.S. PATENT DOCUMENTS

| | | | |
|---|---|---|---|
| 10,238,961 B2 | 3/2019 | Fogtmann et al. | |
| 2012/0050198 A1* | 3/2012 | Cannon | A63F 13/42 345/173 |
| 2012/0062490 A1* | 3/2012 | Heatherly | A63F 13/218 345/173 |
| 2013/0012313 A1 | 1/2013 | Chen | |
| 2013/0032617 A1* | 2/2013 | Adelman | A45C 11/00 224/191 |
| 2014/0078069 A1* | 3/2014 | Hung | A63F 13/426 345/173 |
| 2014/0160054 A1* | 6/2014 | Rabii | G06F 3/0488 345/174 |
| 2015/0293622 A1* | 10/2015 | Han | H04W 12/06 345/174 |
| 2019/0009168 A1 | 1/2019 | Aman | |
| 2019/0232154 A1 | 8/2019 | Kurabayashi | |
| 2020/0117332 A1* | 4/2020 | Wong | G06F 3/04162 |

FOREIGN PATENT DOCUMENTS

| | | |
|---|---|---|
| EP | 2405330 A2 | 1/2012 |
| WO | 2013039388 A1 | 3/2013 |

* cited by examiner

*Primary Examiner* — Temesghen Ghebretinsae
*Assistant Examiner* — Ivelisse Martinez Quiles
(74) *Attorney, Agent, or Firm* — Jason C. Cameron

(57) ABSTRACT

A system and method to track movement of an interactive figurine on a touch screen interface are disclosed. The system includes a first set of conductive pads and a second set of non-conductive pads, a centre pad located at the bottom surface of the interactive figurine which is elevated relative to the first set of conductive pads and the second set of non-conductive pads at a pre-defined height, a switch housed on the interactive figurine to actuate the centre pad to enable a touch interaction of the centre pad with the touch screen interface, processors operatively coupled to the interactive figurine. Furthermore, the processors include an interactive figurine detection module to determine the pre-defined angle between the first set of conductive pads to identify the interactive figurine, an interactive figurine tracking module to track at least one movement of the interactive figurine on the touch screen interface.

15 Claims, 6 Drawing Sheets

SYSTEM AND METHOD TO TRACK MOVEMENT OF AN INTERACTIVE FIGURINE ON A TOUCH SCREEN INTERFACE

This International Application claims priority from a complete patent application filed in India having Patent Application No. 202041007488, filed on Feb. 21, 2020 and titled "SYSTEM AND METHOD TO TRACK MOVEMENT OF AN INTERACTIVE FIGURINE ON A TOUCH SCREEN INTERFACE".

FIELD OF INVENTION

Embodiment of a present invention relates to an interactive system, and more particularly, to a system and method to track movement of an interactive figurine on a touch screen interface.

BACKGROUND

With a linear growth in technology, electronic devices are becoming more user friendly. One of the major applications of technology in recent days is entertainment; and one such entertainment is gaming. Various games and toys have been developed in which a computing device interacts with a physical location of a game controller to keep the games engaged.

Game controllers come in various forms such as keyboards, mouse, gamepads, steering wheels, light guns, joysticks, playing pieces or the like which is used in various platforms such as virtual reality, augmented reality, flat screens or the like to experience 2-dimensional or 3-dimensional effect of the game. Further there have been an attempt to construct various board games with the combination of flat screens such as a touch screen interface and playing pieces such as figurines. Consequently, various type of touch detection techniques such as electrostatic-capacitance-based touch detection technique are being used on the touch screen interface to enable multi touch detection.

In this context, users are in constant exposure to devices having the touch screen interface making it desirable to provide new technologies, which can enhance the interactive experience with touch screen devices and their existing game controllers and devices having such an interaction.

In a conventional approach, creating an interaction between a computing device and the game controller using a wired communication means or a wireless communication means. However, using such communication means makes the conventional approach expensive due to the increase of elements in hardware. Also, user experience in such an approach is limited to a single approach, thereby making the conventional approach less reliable. In addition, accuracy of tracking the game controller is a challenge as intervention of noise from any of the communication means may hamper the same or create a time delay in tracing the interaction of the game controller with the computing device.

Hence, there is a need for an improved system and method to track movement of track movement of an interactive figurine on a touch screen interface.

BRIEF DESCRIPTION

In accordance with an embodiment of a present disclosure, a system to track movement of an interactive figurine on a touch screen interface is disclosed. The system includes a first set of conductive pads and a second set of non-conductive pads. The first set of conductive pads and the second set of non-conductive pads are located at a bottom surface of the interactive figurine and the first set of conductive pads disposed at a pre-defined angle of separation. The system also includes a centre pad located at the bottom surface of the interactive figurine. The centre pad is elevated relative to the first set of conductive pads and the second set of non-conductive pads at a pre-defined height. The system also includes a switch housed on the interactive figurine, wherein the switch configured to actuate the centre pad to enable a touch interaction of the centre pad with the touch screen interface. The system also includes one or more processors operatively coupled to the interactive figurine. Furthermore, the one or more processors includes an interactive figurine detection module configured to determine the pre-defined angle between the first set of conductive pads to identify the interactive figurine. The one or more processors also includes an interactive figurine tracking module configured to track at least one movement of the interactive figurine on the touch screen interface, wherein the at least one movement includes a linear movement, a rotational movement or a combination thereof.

In accordance with another embodiment of the present disclosure, a method for tracking movement of an interactive figurine on a touch screen interface is disclosed. The method includes actuating a centre pad of the interactive figurine for enabling a touch interaction of the centre pad with the touch screen interface. The method also includes determining an angle between a first set of conductive pads for identifying the interactive figurine. The method further includes tracking at least one movement of the interactive figurine on the touch screen interface based on the determined angle.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
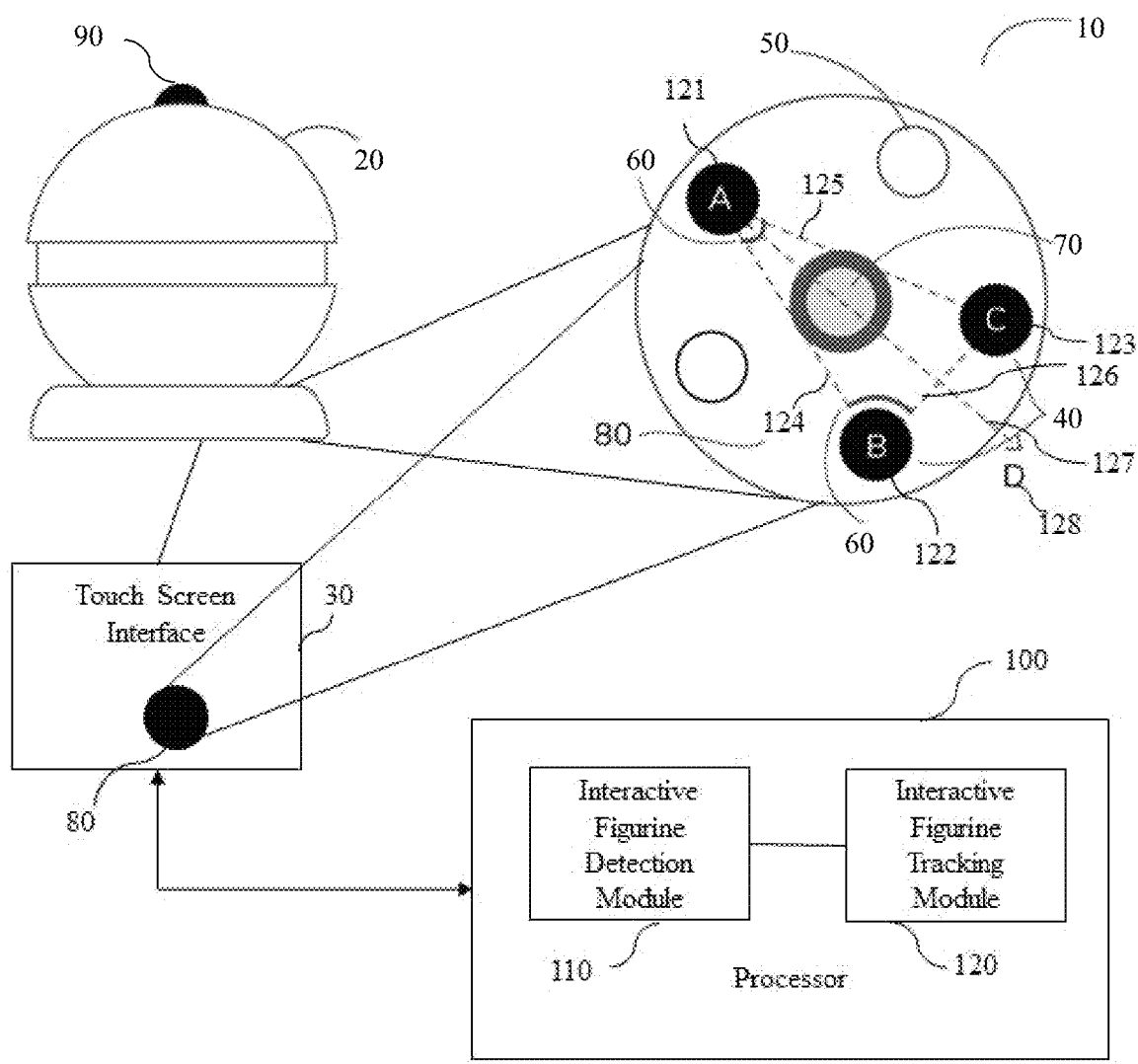
FIG. 1 is a block diagram representation of a system to track movement of an interactive figurine on a touch screen interface in accordance with an embodiment of the present disclosure.

Further, those skilled in the art will appreciate that elements in the figures are illustrated for simplicity and may not have necessarily been drawn to scale. Furthermore, in terms of the construction of the device, multiple components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to system and method to track movement of an interactive figurine on a touch screen interface.

As used herein, the term 'figurine' is defined as a diminutive form of a specific character, tool, accessory or the like. Also, the term 'interactive figurine' as used herein is defined as a figurine which is configured to interact with a specific interactive surface, wherein the interactive surface used herein includes of the touch screen interface. In one specific embodiment, the touch screen interface may be associated to a display interface of a computing device. More specifically, the touch screen interface may be associated to the display interface of one of a laptop, a mobile phone, a tablet, or the like.

Figure 2:
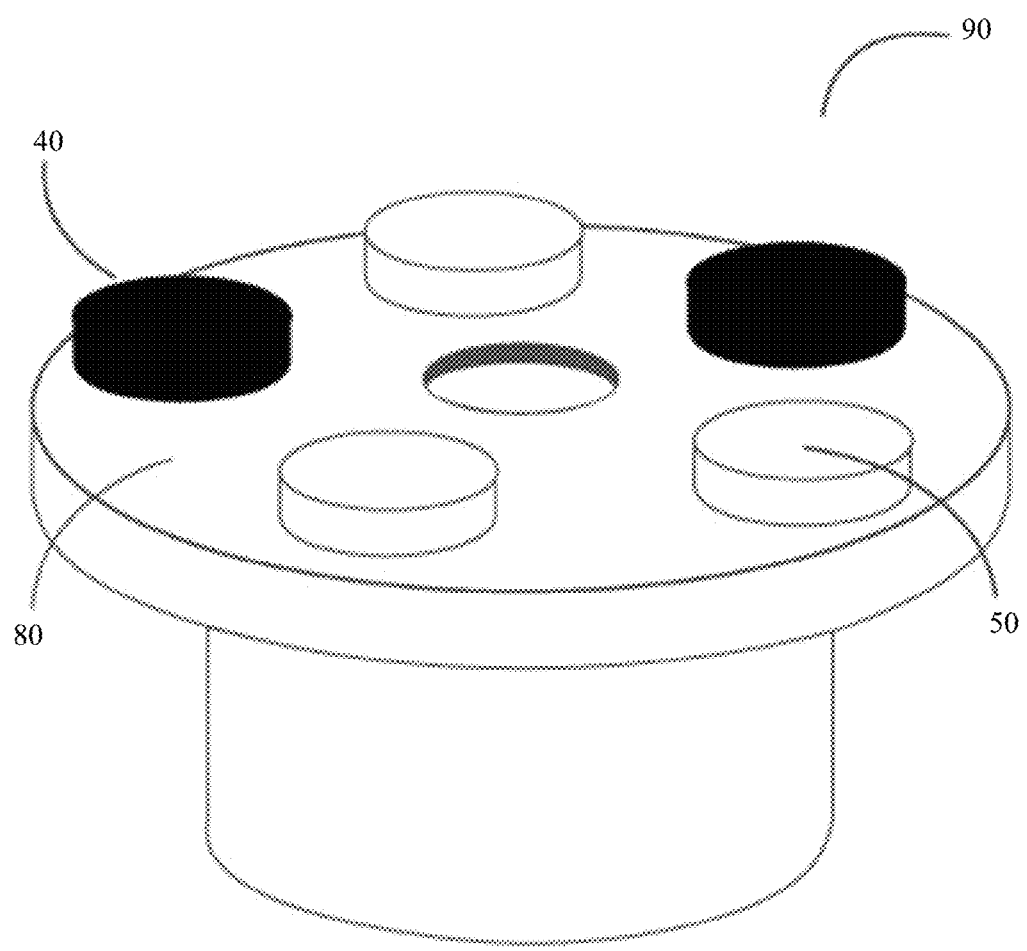
FIG. 2 is an illustrated representation of a base surface of the interactive figurine of FIG. 1 in accordance with an embodiment of the present disclosure.

Turning to FIGS. 1 and 2, FIG. 1 is a block diagram representation of a system 10 to track movement of an interactive figurine 20 on the touch screen interface 30 in accordance with an embodiment of the present disclosure. FIG. 2 is an illustrated representation of a base surface 80 of the interactive figurine 20 of FIG. 1 in accordance with an embodiment of the present disclosure. In one embodiment, the interactive figurine 20 may be composed of one of conductive silicone, conductive plastic or conductive paint. The system 10 includes a first set of conductive pads 40 and a second set of non-conductive pads 50. In one exemplary embodiment, the first set of conductive pads 40 may be composed of one of conductive silicone or conductive rubber.

The first set of conductive pads 40 and the second set of non-conductive pads 50 are located at a bottom surface 80 of the interactive figurine 20. In one embodiment, the first set of conductive pads 40 and the second set of non-conductive pads 50 are located close to an edge of the interactive figurines 20. In one exemplary embodiment, the interactive figurine 20 may be fabricated with specific dimensions which may be associated to a field of application of the system 10. Further, in consideration of the specific dimension of the corresponding interactive figurine 20, the first set of conductive pads 40 and the second set of conductive pads 50 are fastened at the bottom surface 80 also referred to as base of the interactive figurine 20. Furthermore, the first set of conductive pads 40 are disposed at a pre-defined angle of separation 60 at the bottom surface 80 of the interactive figurine 20. More specifically, the first set of conductive pads 40 and the second sets of non-conductive pads 50 are located on the bottom surface 80 of the interactive figurine 20 in such a fashion where a unique angle of measurement is created based on the pre-defined angle of separation 60, wherein the unique angle of measurement engender multiple feature points associated to the interactive figurine 20.

In one exemplary embodiment, the system 10 may be used to track the movement of a multiple interactive figurines 20, wherein each of the multiple interactive figurines 20 may constitute a corresponding first set of conductive pads 40 and the second set of non-conductive pads 50. Further each of the multiple interactive figurines 20 have the first set of conductive pads 40 at a unique pre-defined angle of separation 60. Upon measuring the unique pre-defined angle of separation 60, the corresponding multiple interactive figurines 20 may be identified.

In continuation, the system 10 includes a centre pad 70 located at the bottom surface 80 of the interactive figurine 20. In one specific embodiment, the centre pad 70 may be located at a centre portion of the bottom surface 80 of the interactive figurine 20. The centre pad 70 is elevated relative to the first set of conductive pads 40 and the second set of non-conductive pads 50 at a pre-defined height. In one exemplary embodiment, the interactive figurine 20 may include a hollow opening at the centre portion. The hollow opening may include a shaft. The centre pad 70 may be fixed to a bottom portion of the shaft, which may be elevated inwards from a ground level which is relative to the first set of conductive pads and the second set of non-conductive pads. As discussed above in the afore-mentioned embodiment, each of the multiple interactive figurines 20 may include a corresponding centre pad 70.

Furthermore, the system 10 includes a switch housed on the interactive figurine 20 for actuating the centre pad 70 to enable a touch interaction of the centre pad 70 with the touch screen interface 30. As discussed above, a top portion of the shaft may be connected with a button 90 which actuates the centre pad 70 upon pushing the same by a user. In operation, as the button 90 is pushed/pressed downwards by the user, the switch which is operatively coupled to the button 90 is made to actuate the centre pad 70 to appear to an equal level as that of the first set of conducting pad 40 and the second set of non-conducting pads 50. Also, the interactive figurine 20 is placed on the touch screen interface 30 for enabling an interaction between the touch screen interface 30 and the interactive figurine 20. In one exemplary embodiment, as the button 90 is pushed downwards by the user, the switch actuates the centre pad 70 to enable a touch interaction of the centre pad 70 with the touch screen interface 30.

The system 10 further includes processor 100 operatively coupled to the interactive figurine 20. The processor 100 includes an interactive figurine detection module 110 to determine the pre-defined angle of separation between the first set of conductive pads 40 to identify the interactive figurine 20. More specifically, as the interactive figurine 20 is placed on the touch screen interface 30 by the user, electrostatic charge from user's hand is transferred to the interactive figurine 20 which in turn enables connectivity between the first set of conductive pads 40 to create a real time angle of separation which is used to identify the interactive figurine 20. In one embodiment, the pre-defined angle of separation 60 between the first set of conductive pads 40 may be stored in a storage unit. Further, the real time angle of separation 60 is compared with the pre-defined angle of separation to identify the interactive figurine 20.

In one exemplary embodiment, the electrostatic charge from hand of the user is transmitted to a body of the interactive figurine 20, consequently to the first set of conductive pads 40 and then to the touch screen interface 30. Furthermore, the electrostatic charge at each of the first set of conductive pads 40 are measured and co-ordinates are computed by the interactive figurine detection module 110. In one specific embodiment, a normal direction of the interactive figurine 20 is calculated upon measuring Euclidean distance and Euclidean angle between the multiple feature points; wherein the multiple feature points are formed on the touch screen interface 30 based on the pre-defined angle of separation 60. As used herein, 'Euclidean distance' is defined as a distance between two consecutive points in Euclidean Space. Also, 'Euclidean angle' is defined as an angle formed by an intersection of two planes in Euclidean space. Furthermore, the term 'Euclidean Space' is defined as a two- or three-dimensional space in which the axioms and postulates of Euclidean geometry is applied.

In one exemplary embodiment, the Euclidean distance may be calculated as described below:

Consider three feature points 'A' 121, 'B' 122, and 'C' 123, in a form of a triangle having sides 'AB' 124, 'AC' 125 and 'BC' 126; 'BC' 126 being a base of the triangle, wherein the features point A 121, B 122 and C 123 are substantially similar to the multiple feature points formed on the touch screen interface 30. Also, the triangle is the representative of shape of the angle of separation 60 formed between the first set of conductive pads 40 in the corresponding interactive figurine 20.

Further, the Euclidean distance between the feature point A 121 and the feature point B 122 may be calculated using the relation $$\sqrt{(x_a - x_b)^2 + (y_a - y_b)^2},$$

where $x_a$, $x_b$, $y_a$, $y_b$ represents 'X' and 'Y' co-ordinates of the feature point A 121 and the feature point B 122 respectively.

Further, direction vector for AB 124 may be calculated using the relation: $p=\{x_a-x_b, y_a-y_b\}=\{p_x,p_y\};\}$. Similarly, the direction vector for AC 125 may be calculated using the relation: $q=\{x_c-x_a, y_c-y_a\}=\{q_x, q_y\}$; where, $x_c$ and $y_c$ represents 'X' and 'Y' co-ordinates of the feature point C 123.

Furthermore, the Euclidean angle 60 may be calculated as described below:

The Euclidean angle 60 hereafter indicated as "Θ" between AB 124 and AC 125 may be calculated using the relation:

$$\Theta = \cos^{-1}\left[\frac{p_x q_x + p_y q_y}{\sqrt{p_x^2 + p_y^2} \times \sqrt{q_y^2 + q_x^2}}\right],$$

where A 121, B 122 and C 123 are the multiple features points on the touch screen interface 30, wherein the first set of conductive pads 40 are in contact with the touch screen interface 30. To identify the Euclidean distance; AB 124, AC 125 and Θ 60 are used. Furthermore, AD 127 is a normal vector obtained upon extending angle A 121, 60 up to a point D 128, where 'AD' 127 is perpendicular to the base BC 126, Further, the vector AD 127 is tracked to measure the rotational movement of the interactive figurine 20. In operation, due to the electrostatic charge generated by the user's hand, it is transferred up-to the first set of conductive pads 40 and the second set of non-conductive pads 50 and further to the touch screen interface 30. Based on the electrostatic charge at the first set of conductive pads 40, the co-ordinates of each of the first set of conductive pads 40 is measured by the interactive figurine detection module 110, further to which the Euclidean distance and Euclidean angle is computed in order to identify the interactive figurine 20. In one exemplary embodiment, a conducting pad 'A' may have co-ordinates '$(X_1, Y_1)$' and a conducting pad 'B' may have the co-ordinates '$(X_2, Y_2)$'. Further, based on the electrostatic charge transmitted through A and B, corresponding co-ordinates $(X_1, Y_1)$ and $(X_2, Y_2)$ are measured; further to which the Euclidean distance and Euclidean angle is computed in order to identify the interactive figurine 20. In one specific embodiment, the electrostatic charge flowing through the first set of conductive pads 40 and the centre pad 70 are held at the base 80 of the interactive figurine 20 up to a pre-defined amount of time. In an exemplary embodiment, the pre-defined amount of time in which the electrostatic charge flows through the first set of conductive pads 40 and the centre pad 70 is about two minutes.

In one specific embodiment, the interactive figurine 20 includes multiple digital elements which are activated upon identification of the interactive figurine 20. Each of the multiple digital elements interact with another multiple digital elements. In such embodiment, the multiple digital elements of a first interactive figurine may interact with multiple digital elements of a second interactive figurine to initiate an activity with the touch screen interface 30, wherein the first interactive figurine and the second interactive figurine are substantially similar to the interactive figurine 20. In one exemplary embodiment the activity may include one of playing with toys, gaming, graphic designing, photo editing, video editing, music control, playing instruments, or the like.

Furthermore, the system 10 includes an interactive figurine tracking module 120 which tracks at least one movement of the interactive figurine on the touch screen interface. The at least one movement includes a linear movement, a rotational movement or a combination thereof. As the interactive figurine 20 is operated on the touch screen interface 30 based on the activity, the at least one movement of the interactive figurine on the touch screen interface 30 is tracked by measuring the change in the normal direction of the interactive figurine 20 upon calculating the Euclidean distance and Euclidean angle of the interactive figurine 20 in real time. More specially, the linear movement and the rotational movement of the interactive figurine 20 on the touch screen interface 30 is tracked based on the determined Euclidean angle, the Euclidean distance or a combination thereof.

In one exemplary embodiment, the interactive figurine tracking module 120 may be further configured to track one of velocity, acceleration, a tilt angle or a combination thereof, of the interactive figurine 20. In such embodiment, the tilt angle may be tracked to simulate car banking and tilting of the interactive figurine 20.

In one exemplary embodiment, at least one air pocket may be formed within the corresponding one or more first set of conductive pads 40 and the centre pad 70. The at least one air pocket may provide levelling for the interactive figurine 20 to be in constant contact with the touch screen interface 30. The at least one air pocket may also provide a pre-determined amount of pressure on the touch screen interface 30 for tracking the movement of the interactive figurine 20 on the touch screen interface 30.

In one exemplary embodiment in a game of chess, the system 10 may include multiple interactive figurines (substantially similar to the interactive figurine 20) hereafter referred to as multiple interactive chess figurines, wherein each of the multiple interactive chess figurines (substantially similar to the interactive figurine 20) may be representative of a corresponding plurality of chess pieces. A base surface (substantially similar to the base surface 80 of the interactive figurine 20) of each of the multiple interactive chess figurines may be circular in shape. Further, each of the plurality of the interactive chess figurines are fixed with the first set of conductive pads 40 and the second set of non-conductive pads 50 which are located at the base surface of the multiple interactive chess figurines. The first set of conductive pads 40 and the second set of non-conductive pads 50 are arranged in such a way that each of the multiple interactive chess figurine forms a unique pattern on the screen associated to the multiple unique feature points.

Furthermore, the touch screen interface 30 displays a chess board to enable a first user and a second user to initiate the activity of playing chess. As the multiple interactive chess figurines are placed on the corresponding positions of the chess board on the touch screen interface 30, the normal direction of each of the multiple interactive chess figurines are identified and stored in a memory unit of the computing device. As the first user initiates the activity by moving one of the multiple interactive chess figurines, electrostatic charge from first user's hand is transmitted to the corresponding interactive chess figurine which the first user is operating. Simultaneously, the first user pushes the button of the corresponding interactive chess figurine because of which the centre pad 70 of the interactive chess figurine under operation gets actuated to enable the interaction of the centre pad 70 with the touch screen interface 30. The electrostatic charge is transmitted through the corresponding first set of conductive pads 40 which creates an angle representative of the pre-defined angle of separation 60. Further, using the electrostatic charge at the first set of conductive pads 40 and the second set of non-conductive pads 50, the Euclidean distance and Euclidean angle is measured in real time to identify the corresponding interactive chess figurine from the multiple interactive chess figurines which is being operated by the first user and to track the movement of the same.

As the activity of playing the chess continues, and the first user completes a turn of playing, the second user initiates the operation of another interactive chess figurine from the multiple interactive chess figurines, and the afore-mentioned process continues.

Figure 3:
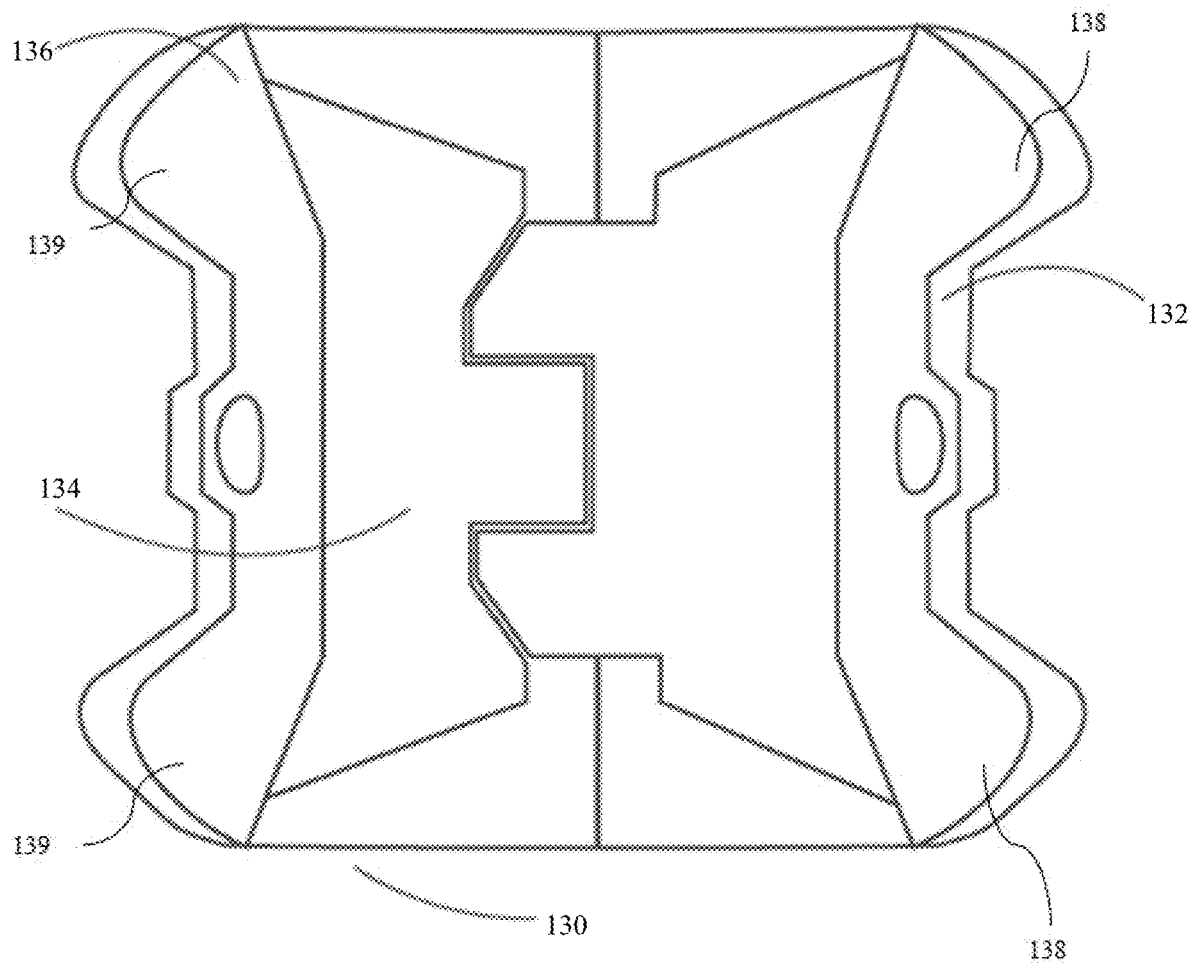
FIG. 3 is a schematic representation of an exemplary embodiment of a flexible accessory of FIG. 1 in accordance with an embodiment of the present disclosure.

FIG. 3 is a schematic representation of an exemplary embodiment of a flexible accessory 130 of FIG. 1 in accordance with an embodiment of the present disclosure. In one exemplary embodiment, the system 10 may further include a flexible accessory 130 adapted to hold a device with the touch screen interface 30. The flexible accessory 130 includes a base surface 134 and a holding means 134 to hold the computing device including the touch screen interface (30 of FIG. 1). The flexible accessory 130 also includes two adjustable flaps 132, 136 fabricated on either side of the base surface 134 to adjust the size of the base surface according to a size of the computing device.

In one exemplary embodiment, the flexible accessory (substantially similar to the flexible accessory of FIG. 3) may include a first side holder (substantially similar to adjustable flap 132 of FIG. 3) and a second side holder (substantially similar to adjustable flap 136 of FIG. 3) which may be detachable from one another. The first side holder 132 may include a flat hollow top surface of the first side holder 132 to hold the touch screen interface 30 at one end. The first side holder also includes two elongated first edges 138 to provide grip for the flexible accessory to hold the touch screen interface 30. Also, the first side holder 132 further includes a first base surface having one or more protective pads on multiple corners of the first side holder 132 for easy and soft placement of the flexible accessory. Additionally, the first side holder 132 may be raised with a pre-defined height to avoid contact of the touch screen interface 30 with a ground surface when placed on a platform.

Furthermore, the second side holder 136 may include a flat hollow top surface of the second side holder 136 to hold the touch screen interface 30 at another end. The second side holder 136 also includes two elongated second edges 139 to provide grip for the flexible accessory to hold the touch screen interface 30. Also, the second side holder 136 further includes a second base surface having one or more protective pads (not shown in FIG. 3) on multiple corners of the second side holder 136 for easy and soft placement of the flexible accessory 130.

Figure 4:
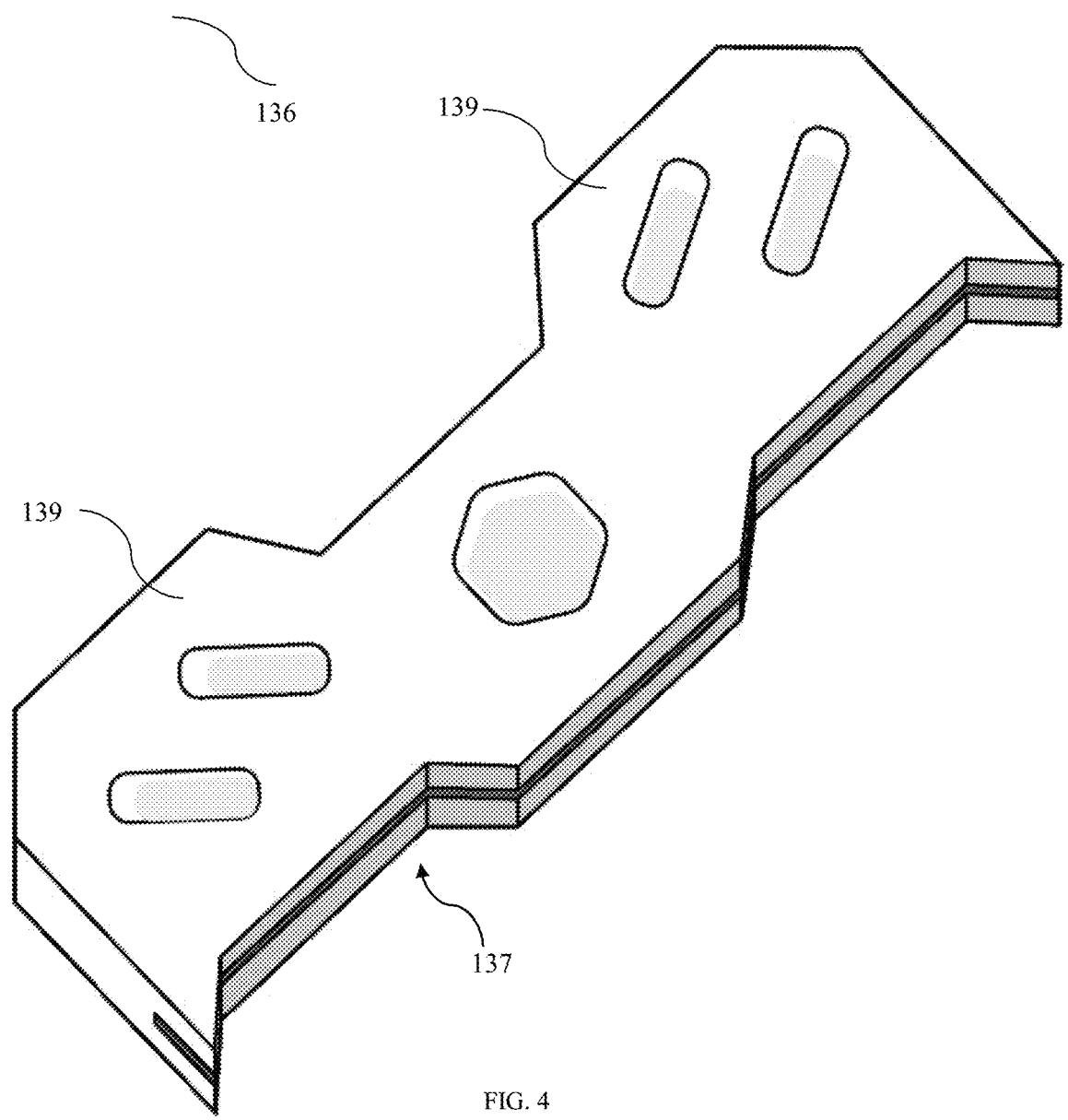
FIG. 4 is a magnified view of an embodiment of the flexible accessory of FIG. 3 in accordance with an embodiment of the present disclosure.

FIG. 4 is a magnified view of an embodiment of the flexible accessory of FIG. 3 representing the second side holder 136 in accordance with an embodiment of the present disclosure. The flexible accessory (130 of FIG. 3) includes the second side holder 136 to hold the touch screen interface 30 at one end. The second side holder 136 (substantially similar to the second side holder 136 of FIG. 3) includes two extended edges 139 which are flattened at the extended portion. Also, the second side holder 136 further includes a second base surface 137 having the one or more protective pads (not shown in FIG. 4) on multiple corners of the second side holder 136 for easy and soft placement of the flexible accessory 130.

Figure 5:
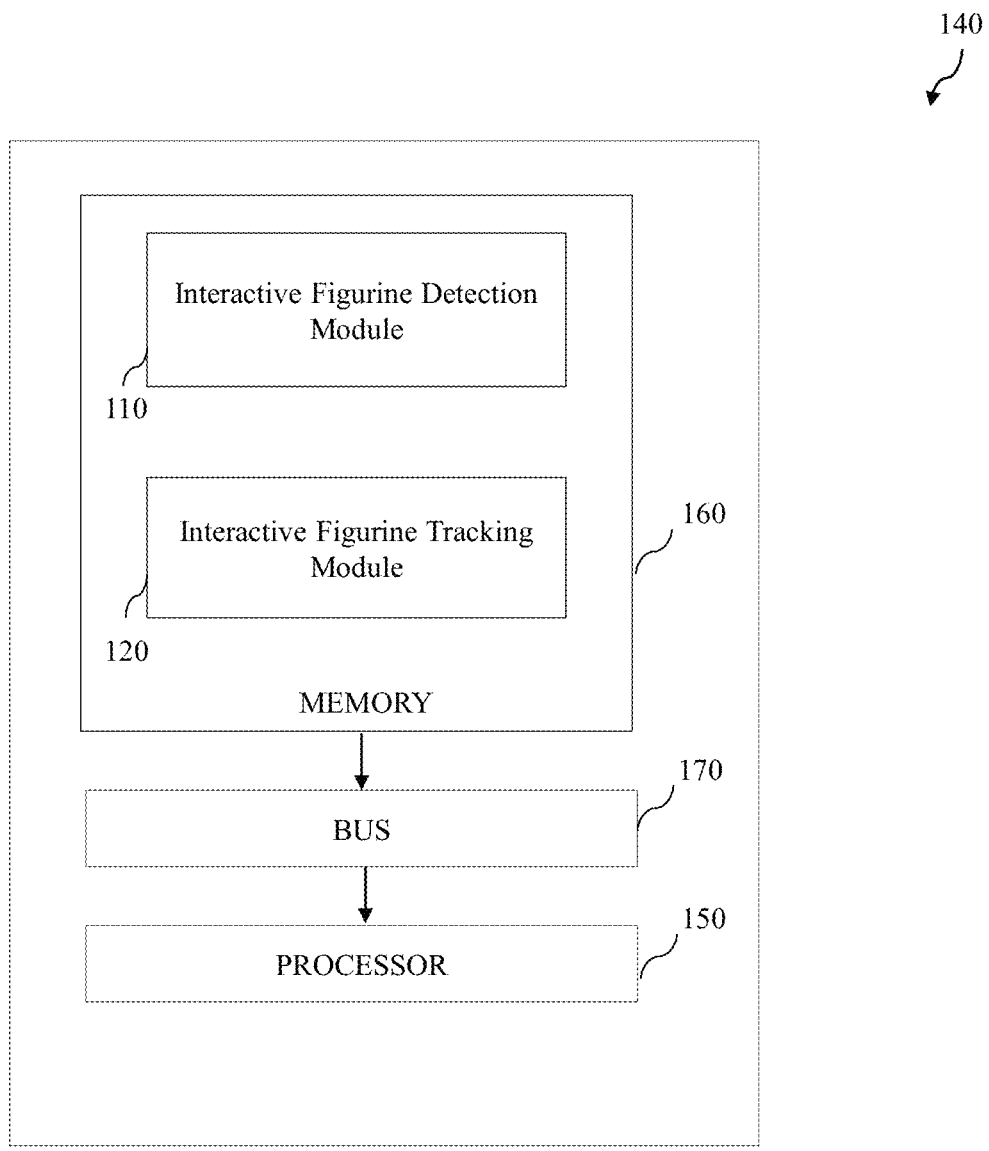
FIG. 5 is a block diagram of a computer or a server in accordance with an embodiment of the present disclosure.

FIG. 5 is a block diagram of a computer 140 or a server in accordance with an embodiment of the present disclosure. The server includes processor(s) 150, and memory 160 operatively coupled via a bus 170. The processor(s) 150, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

Figure 6:
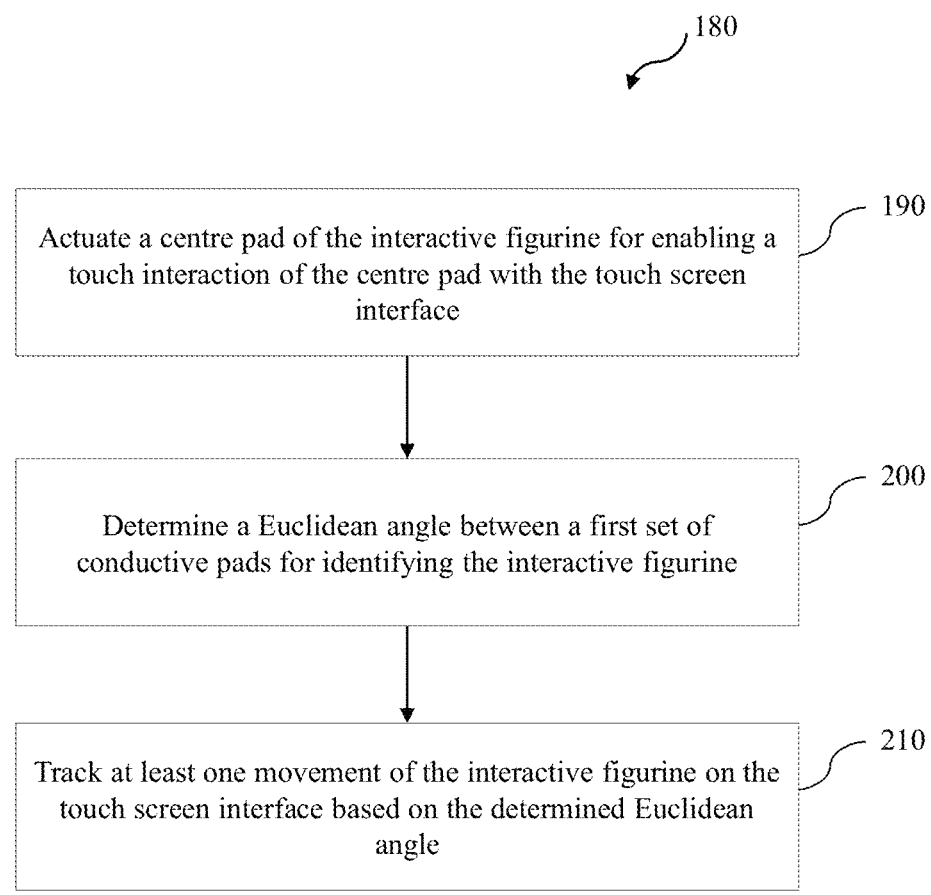
FIG. 6 is a flow chart representing the steps involved in a method for tracking movement of an interactive figurine on a touch screen interface.

The memory 160 includes a plurality of modules of a system of FIG. 1 in the form of executable program which instructs the processor 150 to perform the method steps illustrated in FIG. 6. The memory 160 has following modules: an interactive figurine detection module and an interactive figurine tracking module.

The interactive figurine detection module 110 is configured to determine the pre-defined angle of separation between the first set of conductive pads to identify the interactive figurine. The interactive figurine tracking module 120 is configured to configured to track at least one movement of the interactive figurine on the touch screen interface.

Computer memory 160 elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) 150.

FIG. 6 is a flow chart representing the steps involved in a method 180 for tracking movement of an interactive figurine on a touch screen interface. The method 180 includes actuating a centre pad of the interactive figurine for enabling a touch interaction of the centre pad with the touch screen interface in step 190. In one embodiment, actuating the centre pad of the interactive figurine may include actuating the centre pad using a switch. In such embodiment, actuating the centre pad of the interactive figurine may further include pressing a button downward for actuating the centre pad by a user.

The method 180 also includes determining a Euclidean angle between a first set of conductive pads for identifying the interactive figurine in step 200. In one embodiment, determining the Euclidean angle between the first set of conductive pads may include determining the Euclidean angle between the first set of conductive pads by an interactive figurine detection module. In such embodiment, tracking the angle of separation between the first set of conductive pads may include tracking the angle of separation between the first set of conductive pads upon measuring co-ordinates of each of the first set of conductive pads. In one embodiment, measuring the co-ordinates of each of the first set of conductive pads may include measuring the co-ordinates based on electrostatic charge in the first set of conductive pads received by the user upon operation of the interactive figurine.

Furthermore, the method 180 includes tracking at least one movement of the interactive figurine on the touch screen interface based on the determined Euclidean angle in step 210. In one embodiment, tracking the at least one movement may include tracking the at least one movement by an interactive figurine tracking module. In one exemplary embodiment, tracking the at least one movement may include tracking a linear movement, a rotational movement or a combination thereof associated with the operation of the interactive figurine. In such embodiment, tracking the at least one movement of the interactive figurine may include tracking the at least one movement using electrostatic charge flowing through the first set of conductive pads and the centre pad.

In one exemplary embodiment, tracking the at least one movement of the interactive figurine on the touch screen interface may include tracking a normal direction of the interactive figurine. In such embodiment, tracking the normal direction of the interactive figurine may include determining multiple feature points between the first set of conductive pads and a second set of non-conductive pads. The method 180 may further include calculating Euclidean distance and Euclidean angle between the multiple feature points for tracking the normal direction of the interactive figurine.

In one exemplary embodiment, tracking the at least one movement of the interactive figurine on the touch screen interface may further include tracking one of a velocity, an acceleration, a tilt angle or a combination thereof of the interactive figurine. In such embodiment, tracking the tilt angle may be used to simulate car banking and tilting of the interactive figurine.

Various embodiments of the system and method to track movement of an interactive figurine on a touch screen interface enable the system to create the interactive platform for monitoring and tracking the interaction of the game controller such as figurines with the computing device having the touch screen interface without sacrificing the traditional experience of the activity being performed on the touch screen interface which also enhances the user experience.

In addition, the system accurately tracks the linear and the rotational movement of the interactive figurine using the precision accuracy of the interactive figurine. The system can also track the movement of multiple figurines simultaneously in real time. Also, the multiple digital elements are made to interact with one another while the activity is being performed which enhances the gameplay.

Furthermore, as the interaction of the interactive figurine with the touch screen interface happens with the electrostatic charge, there is no additional communication medium required for coupling, thereby making the system cost effective and less complex due to the reduction of hardware components in the system. In addition, due to the formation of the multiple air pockets, auto-levelling of the interactive figurine is enabled on the touch screen interface, a constant contact is established between the interactive figurine and the touch screen interface, small consistent pressure is created on the touch screen interface which enhances the tracking performance of the interactive figurine and a soft landing of the interactive figurine on the touch screen interface is established which assists in protection of the touch screen interface of the computing device.

Moreover, accuracy of the detection and tracking of the interactive figurine is increased by using the method of detecting the angle of separation between the conductive pads by measuring the Euclidean distance and Euclidean angle between the conductive pads. Also, as the figurine is subjected to operation, the system can move the digital assets with about 1 degree of precision as the normal direction is constantly tracked using Euclidean distance and Euclidean angle.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system to track movement of an interactive figurine on a touch screen interface comprising:
    a first set of conductive pads;
    a second set of non-conductive pads,
    wherein the first set of conductive pads and the second set of non-conductive pads are located at a bottom surface of the interactive figurine, the first set of conductive pads disposed at a pre-defined angle of separation;
    a centre pad located at the bottom surface of the interactive figurine, wherein the centre pad is elevated relative to the first set of conductive pads and the second set of non-conductive pads at a pre-defined height;
    a switch housed on the interactive figurine, wherein the switch is configured to actuate the centre pad to enable a touch interaction of the centre pad with the touch screen interface; and
    one or more processors operatively coupled to the interactive figurine, wherein the one or more processors comprises:
        an interactive figurine detection module configured to determine the pre-defined angle of separation between the first set of conductive pads to identify the interactive figurine; and
        an interactive figurine tracking module configured to track at least one movement of the interactive figurine on the touch screen interface, wherein the at least one movement comprises a normal direction, wherein tracking the normal direction of the interactive figurine comprises:
        determining one or more feature points on the touch screen interface between the first set of conductive pads and a second set of non-conductive pads; and
        calculating an Euclidean distance and an Euclidean angle between the one or more feature points for tracking the normal direction of the interactive figurine.

2. The system of claim 1, wherein the interactive figurine is composed of one of conductive silicone, conductive plastic or conductive paint.

3. The system of claim 1, wherein the first set of conductive pads and the centre pads are composed of one of conductive silicone or conductive rubber.

4. The system of claim 1, wherein the at least one movement of the interactive figurine is tracked using electrostatic charge flowing through the first set of conductive pads and the centre pad.

5. The system of claim 4, wherein the electrostatic charge flowing through the first set of conductive pads and the centre pad is held at the bottom surface of the interactive figurine up to a pre-defined amount of time.

6. The system of claim 5, wherein the pre-defined amount of time in which the electrostatic charge flows through the first set of conductive pads and the centre pad is about two minutes.

7. The system of claim 1, wherein the interactive figurine tracking module is further configured to track one of velocity, acceleration, a tilt angle or a combination thereof of the interactive figurine.

8. The system of claim 1, further comprises a flexible accessory adapted to hold a device with the touch screen interface.

9. The system of claim 1, further comprises one or more digital elements which are activated upon identification of the interactive figurine, wherein each of the one or more digital elements are configured to interact with another one or more digital elements to enhance an activity associated with the interactive figurine.

10. The system of claim 1, further comprising at least one air pocket formed within a corresponding one or more first pads of the first set of conductive pads and the centre pad, wherein the at least one air pocket is configured to:
    provide levelling for the interactive figurine to be in constant contact with the touch screen interface; and
    provide a pre-determined amount of pressure on the touch screen interface for tracking the movement of the interactive figurine on the touch screen interface.

11. A method for tracking movement of an interactive figurine on a touch screen interface comprising:
    actuating, by a switch, a centre pad of the interactive figurine for enabling a touch interaction of the centre pad with the touch screen interface;
    determining, by an interactive figurine detection module, a first Euclidean angle between a first set of conductive pads for identifying the interactive figurine; and
    tracking, via an interactive figurine tracking module, at least one movement of the interactive figurine on the touch screen interface based on the determined first Euclidean angle,
    wherein the at least one movement comprises a normal direction, and wherein tracking the normal direction of the interactive figurine comprises:
        determining one or more feature points on the touch screen interface between the first set of conductive pads and a second set of non-conductive pads; and
        calculating an Euclidean distance and a second Euclidean angle between the one or more feature points for tracking the normal direction of the interactive figurine.

12. The method of claim 11, wherein actuating the centre pad of the interactive figurine comprises pressing a button downward for actuating the centre pad.

13. The method of claim 11, wherein tracking the at least one movement of the interactive figurine on the touch screen interface further comprises tracking a linear movement, a rotational movement or a combination thereof.

14. The method of claim 11, wherein tracking the at least one movement of the interactive figurine on the touch screen interface comprises tracking the at least one movement using electrostatic charge flowing through the first set of conductive pads and the centre pad.

15. The method of claim 11, wherein tracking the at least one movement of the interactive figurine further comprises tracking one of velocity, acceleration, a tilt angle or a combination thereof of the interactive figurine.

* * * * *